United States Patent

[11] 3,584,807

| [72] | Inventor | Tom F. Smith<br>Urbana, Mo. |
|---|---|---|
| [21] | Appl. No. | 819,025 |
| [22] | Filed | Apr. 24, 1969 |
| [45] | Patented | June 15, 1971 |
| [73] | Assignee | Autoscope, Inc. |

[54] TAKEUP MECHANISM
4 Claims, 5 Drawing Figs.

[52] U.S. Cl. .................................................. 242/201,
242/205
[51] Int. Cl. ..................................................... B11b 15/32,
G03b 1/04
[50] Field of Search ........................................ 242/188,
189, 191, 201, 204, 205, 75.4

[56] References Cited
UNITED STATES PATENTS

| 1,629,029 | 5/1927 | Garbutt .......................... | 242/189 |
| 2,094,581 | 10/1937 | Bundick et al. ................ | 242/189 |
| 2,725,200 | 11/1955 | Ward ............................. | 242/189 |

*Primary Examiner*—Leonard D. Christian
*Attorneys*—Clarence A. O'Brien and Harvey B. Jacobson

ABSTRACT: A takeup mechanism in the form of a sprocket wheel engaging a film which the sprocket wheel mounted on a spring-biased arm so that the arm will swing in response to increase and decrease in tension on the film. A takeup reel brake is actuated and released in response to pivotal movement of the spring-biased arm thereby applying and releasing the brake in response to tension on the film.

PATENTED JUN 15 1971

Tom F. Smith
INVENTOR.

BY Clarence A. O'Brien
and Harvey B. Jacobson
Attorneys

Tom F. Smith
INVENTOR.

BY Clarence A. O'Brien
and Harvey B. Jacobson
Attorneys

TAKEUP MECHANISM

This invention relates to a takeup mechanism for use in a moving picture projector, and has for its primary object the provision of means for maintaining the proper tension on moving picture film.

It is often highly desirable to utilize film in considerable lengths so that a continuous operation and showing of the motion picture film can be obtained without the necessity of more than one camera. However, due to the fact that during the winding and unwinding of the film about the reels provided therefor, the linear takeup of the film will change as more and more film is unwound from or wound upon the reels, there often results casualties and damage to the film from the changes in speed of the film. The present invention includes the concept of providing an automatically actuated brake which operates to slow down the winding reel when the tension upon the film becomes too great, yet which is disengaged automatically upon decrease of the tension on the film.

Still further objects and features of this invention reside in the provision of a takeup mechanism for use in conjunction with a motion picture projector which allows the utilization of motion picture film of much greater length while being extremely simple in construction and being especially adaptable for use in conjunction with drive-in theaters.

These, together with the various ancillary objects and features of the invention which will become apparent as the following description proceeds, are attained by this takeup mechanism, a preferred embodiment of which has been illustrated in the accompanying drawings, by way of example only, wherein.

Figure 1:
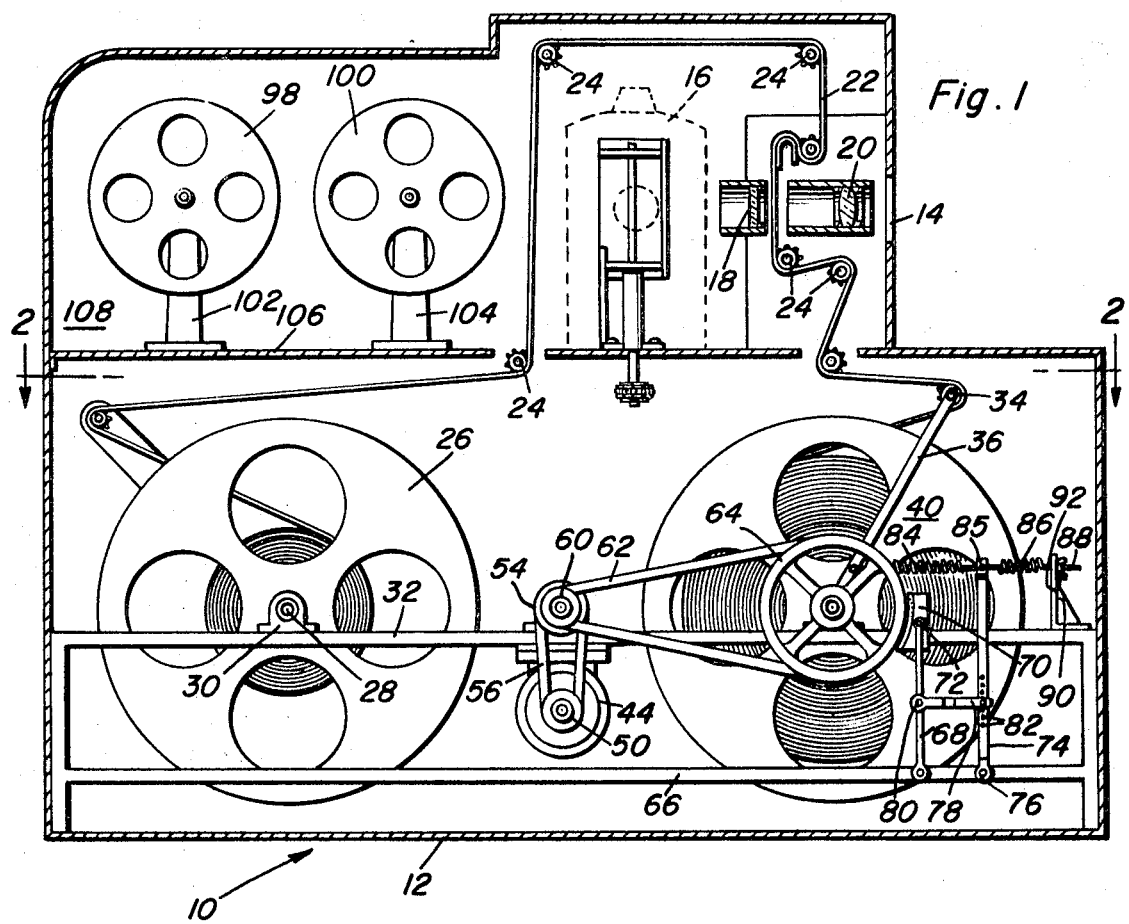
FIG. 1 is a sectional view illustrating the construction of a motion picture projector employing the takeup mechanism comprising the present invention.
Figure 2:
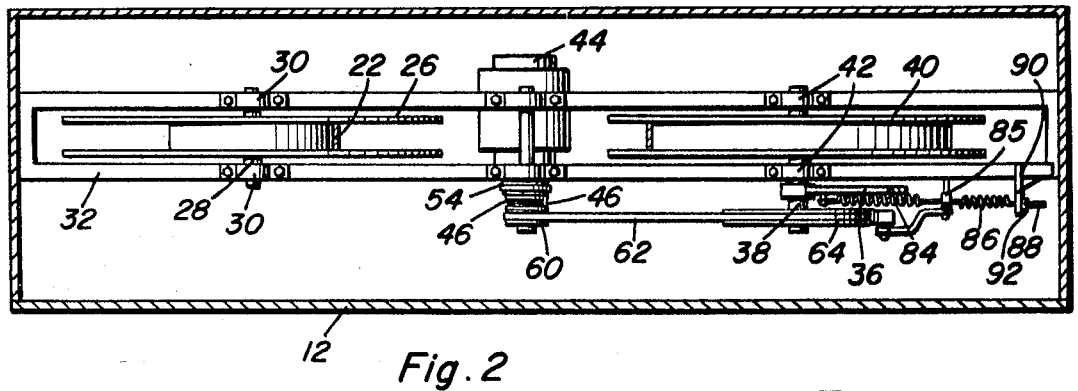
FIG. 2 is a horizontal sectional view as taken along the plane of line 2–2 in FIG. 1.
Figure 3:
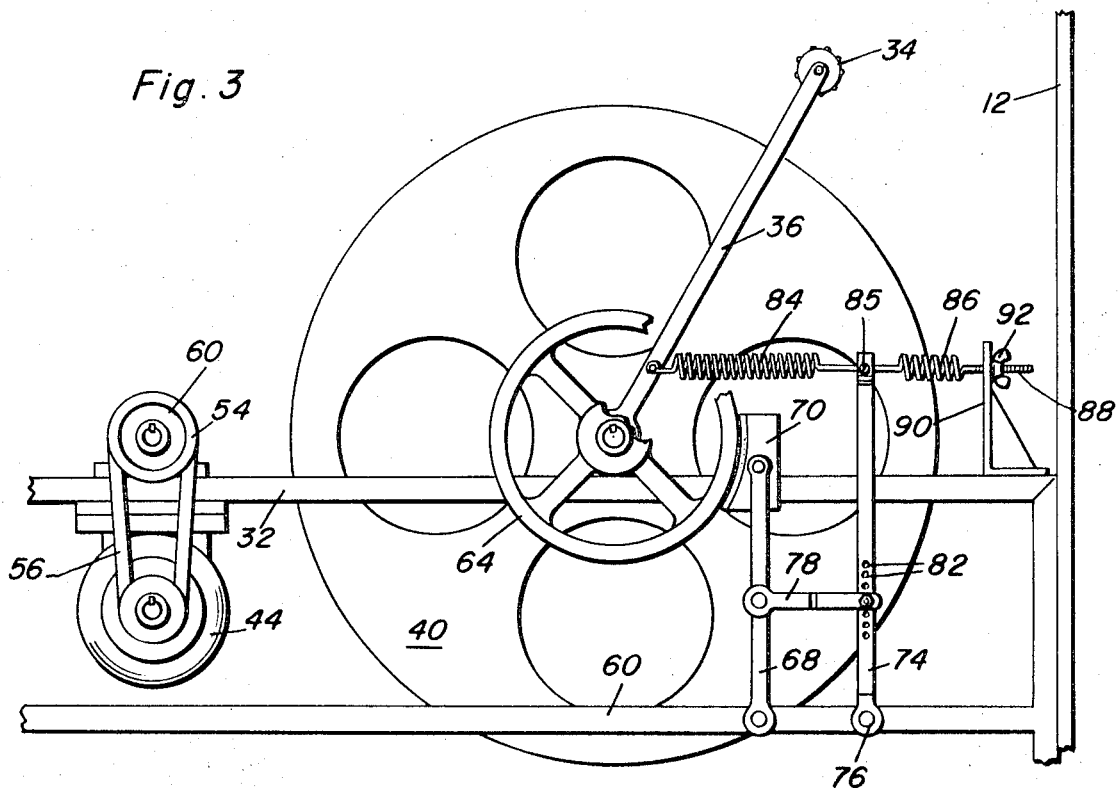
FIG. 3 is an enlarged elevational view of a portion of the takeup mechanism including the brake means and actuating mechanism therefor.
Figure 5:
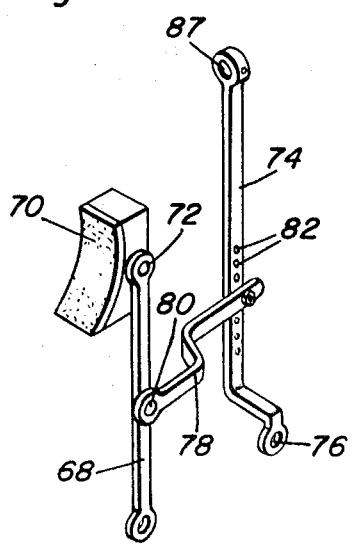
FIG. 5 is a perspective view illustrating the brake means and the actuating structure therefor.
Figure 4:
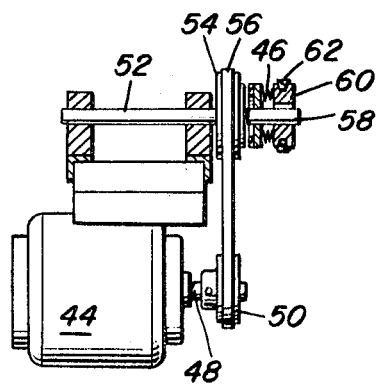
FIG. 4 is a sectional detail view illustrating the construction of the continuous slipping clutch utilized in the invention.

With continuing reference to the accompanying drawings wherein like reference numerals designate similar parts throughout the various views, reference numeral 10 is used to generally designate the projection equipment incorporating the takeup mechanism comprising the present invention. The projection equipment 10 includes a housing 12 having an opening 14 therethrough through which a focused beam can be directed, there being provided a suitable light source 16 for directing light rays through suitable lenses, as at 18 and 20, arranged in any desired manner and through a film 22 entrained about suitable sprockets 24 arranged as desired within the housing 12.

The film is normally wound upon a reel 26 on a shaft 28 journaled in bearings 30 in the housing 12, the bearings being mounted on a support 32. After being entrained about the sprockets 24, the film is passed over a sprocket 34 carried by an arm 36 pivotally mounted on the shaft 38 on which the winding reel 40 is mounted, the shaft 38 being journaled in suitable bearings 42 carried by the support 32.

The winding reel 40 is driven by a motor 44 through a continuous slipping spring pressed clutch mechanism 46 which interconnects the shaft 48 driven by the motor 44 and a pulley 50 mounted on the shaft 48 and a shaft 52 having a pulley 54 mounted thereon about which the endless belt 56 is entrained, the endless belt being also entrained about pulley 50 with a shaft 58 having a pulley 60 mounted thereon. The shaft 58 and thus the pulley 60 will rotate in accordance with the rotation of the shaft 48 and the motor 44 except when the load thereon is sufficient to cause slipping of the clutch mechanism 46. The pulley 60 has entrained therearound an endless belt 62 which is also entrained about a wheel 64 mounted on the shaft 38.

Pivotally mounted on the support bar 66 within the housing 12 is a brake actuating link 68 to which a brake shoe 70 is pivotally attached, as at 72. An operating link 74 is pivotally attached, as at 76, to the support 66 and a connecting member 78 is pivotally attached to the brake actuating link 68, as at 80, and is adjustably held in a selected one of the series of vertically spaced apertures 82 in the operating link 74.

A spring section 84 is terminally pivotally attached to the arm 36 and to the upper end of the operating link 74, and a further spring section 86 is attached at one end to the operating link 74, the other end of the spring section 86 being threaded, as at 88, and extending through a stop 90 secured to the support 32 so that a wing nut 92 or like fastener can be used to adjustably hold the spring section 86 in position. The spring sections 84 and 86 form resilient means for continuously urging the arm 36 to maintain tension on the film 22. However, should the tension on the film 22 become too great, the arm 36 will be pulled back which, in turn, will cause the spring section 84 to pull against the tension on the spring section 86, thereby pulling the operating link 74 and hence the brake actuating link 68 to a position where the show 70 will engage the wheel 64 and the belt 62 entrained therearound to slow the rotation of the belt 62 and cause slipping of the clutch mechanism 46, thereby reducing the tension on the film 22 by the slower operation thereof. This will restore the desired tension to the film 22 and ensure a continuous and smooth operation thereof.

The sprockets 24 and 34 may preferably be in the form of smooth faced rollers with the only toothed sprockets being those normally provided in the projector or camera mechanism.

It is to be recognized that by use of the enlarged reels 26 and 40, a full length feature film can be shown continuously by only one projector, the entire film being capable of being wound on either of the reels 26 or 40. For short subjects or the like, other reels, as at 98 and 100, can be mounted on suitable stands 102 and 104 on a platform 106 and in a compartment 108 provided in the housing 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A takeup mechanism comprising a winding reel for receiving a flexible web and an unwinding reel, a pivotally mounted arm with a resilient means for urging said arm in a first direction attached to said arm, a sprocket carried by said arm and adapted to have said flexible web entrained thereabout for urging said arm in a second direction opposite to said first direction, and brake means engageable with said winding reel and attached to said resilient means so that sufficient movement of said arm in said second direction will cause engagement of said brake means with said winding reel, said winding reel drive means being a continuously slipping clutch connecting said drive means to said winding reel.

2. The structure as defined in claim 1 wherein said brake means includes a brakeshoe, a pivotally mounted brakeshoe actuating link, said brakeshoe being pivotally secured to said link, a pivotally mounted operating link connected to said resilient means, and a connecting rod adjustably interconnecting said operating link and said brakeshoe actuating link.

3. The structure as defined in claim 2 together with means for adjusting said resilient means and the initial position of said operating link.

4. In a takeup mechanism including a takeup reel for receiving a flexible web thereon and a supply reel for the flexible web from which the web is unwound, web engaging means engaging the web between the takeup reel and supply reel, means movably supporting said web engaging means for enabling the web engaging means to move in response to variation in tension of the flexible web, adjustable resilient means engaging the said movable support means for urging said web engaging means in a direction to takeup slack in the flexible web between the takeup reel and supply reel, and brake means operatively associated with said takeup reel and the web engaging means for causing the brake means to retard movement of the takeup reel when the tension in the flexible web exceeds a predetermined level and the web moves towards a straight line condition between the reels to move the web engaging means to operate the brake means, wherein the brake means does not engage the winding reel when the proper tension is reestablished, said web engaging means including a roller, said brake means including a brake shoe operatively engaging the takeup reel, a pivotal support arm for the brakeshoe, said resilient means being operatively associated with the roller, a pivotal link disposed in substantially parallel relation to the support arm for the brakeshoe, a rod pivotally interconnecting the intermediate portions of the arm and link, one end of said link being connected to the resilient means for movement in response to movement of the resilient means in response to movement of the roller.